April 21, 1959     P. B. NICHOLS     2,883,256
DEPTH RECORDER Filed Feb. 24, 1955     8 Sheets-Sheet 1

Fig. 1.

INVENTOR
Paul Briscoe Nichols
BY Stevens, Davis, Miller & Mosher
ATTORNEYS

April 21, 1959 P. B. NICHOLS 2,883,256
DEPTH RECORDER
Filed Feb. 24, 1955 8 Sheets-Sheet 3

INVENTOR
Paul Briscoe Nichols

BY Stevens, Davis, Miller & Mosher
ATTORNEYS

April 21, 1959

P. B. NICHOLS 2,883,256

DEPTH RECORDER

Filed Feb. 24, 1955

INVENTOR
*Paul Briscoe Nichols*

BY *Stevens, Davis, Miller & Mosher*
ATTORNEYS

April 21, 1959

P. B. NICHOLS 2,883,256

DEPTH RECORDER

Filed Feb. 24, 1955

INVENTOR
*Paul Briscoe Nichols*

BY *Stevens, Davis, Miller & Mosher*
ATTORNEYS

April 21, 1959 — P. B. NICHOLS — 2,883,256
DEPTH RECORDER
Filed Feb. 24, 1955 — 8 Sheets-Sheet 7

INVENTOR
Paul Briscoe Nichols
BY Stevens, Davis, Miller & Mosher
ATTORNEYS

April 21, 1959 P. B. NICHOLS 2,883,256
DEPTH RECORDER
Filed Feb. 24, 1955 8 Sheets-Sheet 8

INVENTOR
*Paul Briscoe Nichols*
BY
*Stevens, Davis, Miller & Mosher*
ATTORNEYS

United States Patent Office 2,883,256
Patented Apr. 21, 1959

2,883,256
DEPTH RECORDER

Paul B. Nichols, Oklahoma City, Okla., assignor to The Geograph Company, Oklahoma City, Okla., a partnership Application February 24, 1955, Serial No. 490,339

17 Claims. (Cl. 346—49)

This invention relates to an apparatus for visually recording various aspects of drilling operations and in particular this invention constitutes an improvement over the type of device disclosed in U.S. Patent No. 2,287,819, issued June 30, 1942.

The intrinsic value of an apparatus functioning in the art of drilling earth formations that is capable of recording, in conjunction with a rotary drilling rig, the actual time sequence of a drilling operation, the speed of penetration through earth formations, the depth of drilling and the strain being exerted onto the drill rig during pulling out and run down of drill pipe will be appreciated. In addition to the above, it will be recognized as most desirable to provide an apparatus of the character described for recording various miscellaneous bits of information, such as, change in drilling action of a bit as it penetrates formations of varying degrees of hardness, the time and fact of running in and pulling out drill pipe, the making of connections, the time of shut-downs for repairs or other reasons all in their relation to time and in their sequence to each other.

Accordingly, it is an object of the present invention to provide an apparatus as above described which will be characterized by a simple construction and which will be capable of positive operation and responsiveness to movements of the drill string of a rotary rig.

It is a further object of the present invention to provide a self-contained apparatus for the purposes previously enumerated ruggedly constructed for lasting and reliable performance under the most adverse conditions.

As a still further object of the present invention, an apparatus is provided which does not require an external source of power and thus its usefulness is in no way restricted by the presence or absence of a convenient supply of electrical, steam, or other kind of power.

The above objects as well as others of the invention which will become more readily apparent from the detailed description are accomplished by means of the apparatus to be hereinafter described, the preferred form of which is illustrated in the accompanying drawings in which.

Figure 1:
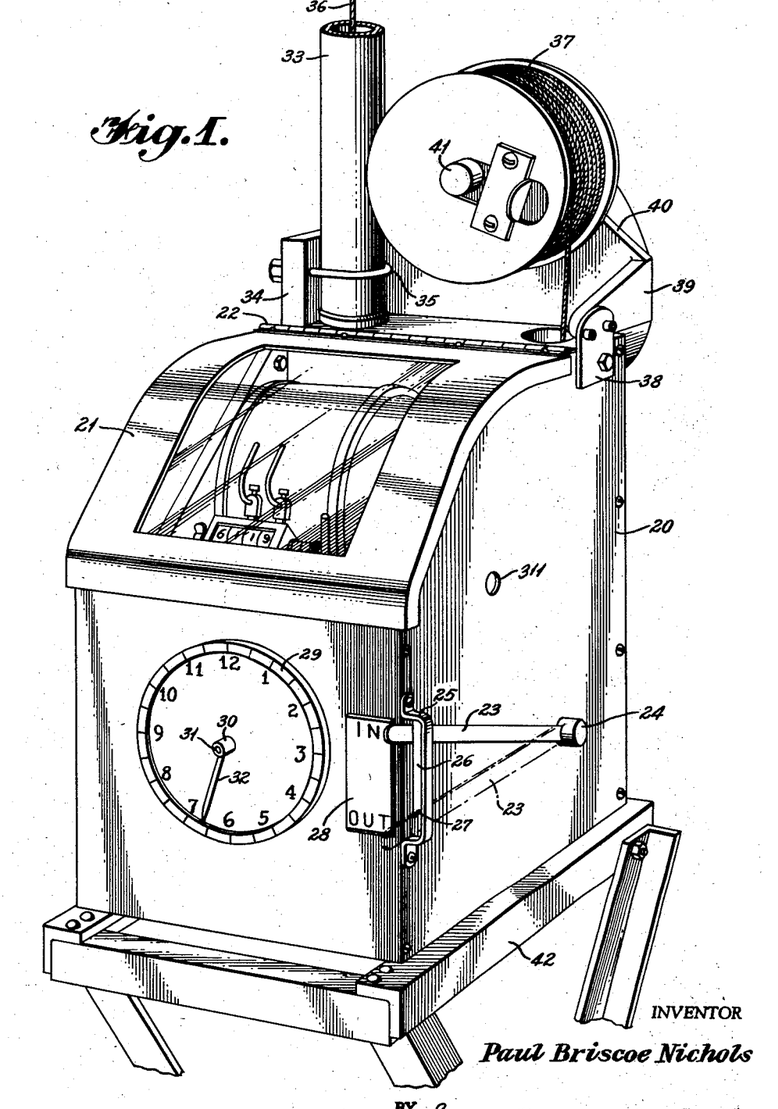
Figure 1 is a view in perspective of the novel recording apparatus of the present invention.
Figure 4:
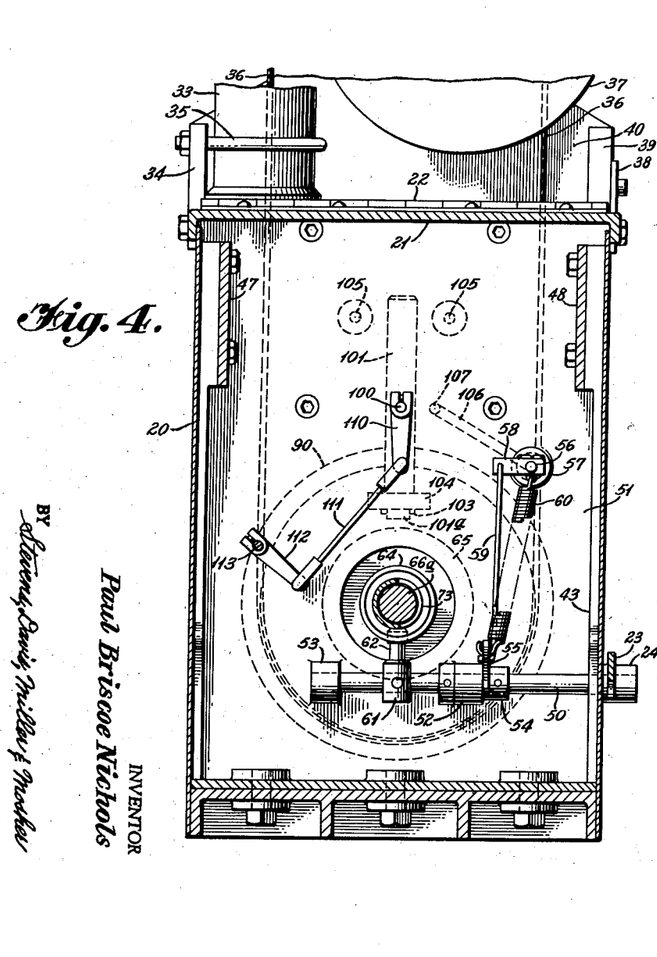
Figure 4 is a view in section of the apparatus illustrated in Figure 2 taken along line 4—4.

Referring now in detail to the several drawings, Figure 1 shows the novel apparatus of the present invention as viewed in perspective. As shown, the apparatus is constituted of a box-like casing 20 covering a frame, not shown in this view of the apparatus. A cover 21 is hinged along the top of the casing 20 by means of hinge member 22 which enables the cover 21 to be lifted and access to be conveniently gained to the interior of the apparatus. Along the right side of the apparatus is located an operating handle 23 provided at one end with a hub 24 fixed onto a shaft 50 (see also Fig. 4) projecting through the casing 20. The handle 23 is thus pivotally mounted to swing from the position shown in solid lines to the position shown in dot-dash lines. A bracket 25 is attached to the casing 20 and serves as a guide for the forward end of the operating handle 23. The guide 25 defines with the casing 20 an elongated slot in which is received the free end of the operating handle 23. The guide 25 includes a web part 26 which is cut out at the lower end of the guide 25 to define in the guide slot a depression 27 which is suitably shaped to receive and positively hold the operating handle 23 when in its lowered position. A plate 28 is mounted on the front of the casing 20 and is suitably marked with the indicia "IN" and "OUT" in positions corresponding with the upper and lower positions of the operating handle 23.

Also mounted to the front of the casing 20 is a dial 29 suitably marked with numerical indicia, as will be evident. A shaft section 30 projects through the front part of the casing 20 and received in the shaft section 30 is a radial pointer 32 fixed in position by a set screw 31 (see also Fig. 9). To the top of the casing 20 is fixed a tube 33 by any convenient means such as plate 34 attached to the casing 20 and a U-bolt 35 which clamps the tube 33 to the plate 34. A cable 36 attached at one end to the conventional tackle mechanism of the rotary drill rig passes through the tube 33 and into the apparatus.

On the other side of the apparatus is mounted a winding drum 37 which takes up the cable 36 after it has passed through the apparatus. The winding drum 37 is mounted to the apparatus by means of any suitable bracket arrangement which may consist, for example, of a plate 38 attached to the casing 20, a bracket arm 39 attached to the plate 38 and integral with the bracket arm 39 a twisted bracket arm 40. On the free end of the twisted bracket arm 40 is mounted a shaft 41 upon which is received the winding drum 37. Connected with the cable winding drum 37 is a suitable mechanism which is normally biased to rotate the drum in a direction to wind cable 36 thereon, but yet is yieldable responsive to pull of the cable 36 to permit unwinding of the cable from the drum 37 and being thus arranged, the drum is fully capable of closely following the movements of the drilling string. The means connected to the winding drum 37, although not illustrated in Figure 1, may be comprised of a spring motor which is normally tensioned to rotate the drum in wind-up direction. As illustrated in Figure 1, the apparatus may be located at any convenient point with respect to a drilling operation. The apparatus, as will be evident, is completely self-contained and requires no auxiliary apparatus or independent source of power for its proper function. As illustrated in Figure 1, the apparatus is shown located upon a stand 42.

The operating handle 23 by means of hub 24 is fixed to the end of shaft 50 (see Figure 4) which projects through the casing 20. Internally of the casing 20 is located a side frame element 43 and a frame partition 51. Shaft 50 is bearing-supported by means of brackets 52, 53 attached to the frame partition 51 and by the side frame element 43. Received on and fixed to the shaft 50 is a collar 54 carrying integral therewith a radial finger 55. Journaled in the frame partition 51 vertically spaced above the shaft 50 is a short stub shaft 56. For this purpose, a hub 57 is integrally fixed onto the frame partition 51 or alternatively the hub 57 may conveniently be cast as an integral part of the frame partition 51. Attached to the end of stub shaft 56 is one end of arm 58, the other end of which is connected by means of a rigid link 59 to the end of radial finger 55. Additionally, a spring 60 is connected at one end to the radial finger 55 and at its other end to an eye formed on the end of arm 58 fixed to the stub shaft 56. The spring 60 acting on the radial finger link 55 biases the shaft 50 in a manner to hold the operating handle 23 normally in its upper, or "in" position.

A collar 61 (see Figure 6) fixed to the shaft 50 between the brackets 52 and 53 is characterized by a radially projecting stub pin 62 which fits in a groove 63 cut in hub 64 of a clutch plate 65. The clutch plate 65 is keyed to a shaft section 66a which, together with shaft section 66b and 66c, constitutes the main drive shaft of the apparatus. Shaft section 66c, the end section, is received and held at one end in rear frame plate 44 through the agency of ball bearing assembly 67 and thus is free to rotate relative to plate 44. As will be evident from Figure 6, the shaft section 66a defines with shaft section 66b a shoulder 68, and likewise, the shaft section 66b defines with shaft section 66a a second shoulder 69. In the vicinity of the shoulder 67 shaft section 66c is threaded as indicated by the numeral 70. Fixed onto the shaft section 66a is a collar 71 by means of a set screw 72. Received on the shaft section 66a between the collar 71 and the hub 64 of the clutch plate 65 is a compression spring 73. By virtue of this arrangement, the spring 73 normally urges the clutch plate 65 to the right as viewed in Figure 6 and the plate will assume the position in which it appears in this figure. The handle 23 in these circumstances will be in its upper position. By moving the operating handle 23 from its upper position to its lower position, the shaft 50 will be rotated counter-clockwise as viewed in Figure 6 and hence the stud 62 will swing to the left. This movement of stud 62 will result in the clutch plate 65 being forced to the left on the shaft section 66a against the bias of spring 73 and the movement will continue until hub 64 and clutch plate 65 assume the position indicated by the dotted lines in Figure 6.

Figures 6, 7:
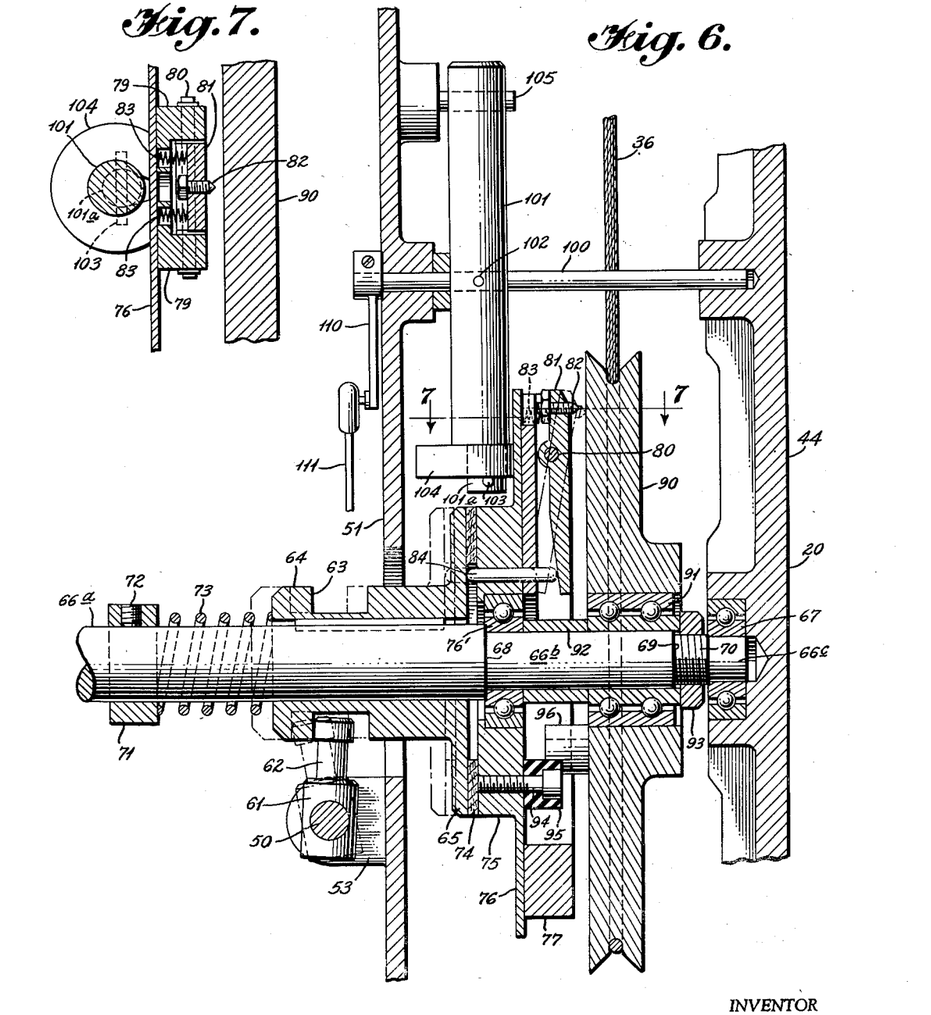
Figure 6 is a view in section of Figure 5 taken along line 6—6.
Figure 7 is a view in section of Figure 6 taken along line 7—7.

The face of the clutch plate 65 is provided with an annulus 74 composed of a material having desirable frictional characteristics. A second clutch plate 75 is mounted on the shaft section 66b through the medium of ball-bearing assembly 76 and hence the clutch plate 75 is free to rotate relative to the shaft section 66b. As shown in Figure 6, the clutch plates 65 and 75 are engaged and thus any rotational movement of either clutch plate will be imparted to the other. On the other hand, when the clutch plate 65 is in its retracted position, as illustrated by the dotted lines, it will be disengaged from the clutch plate 75 and thus motion of one clutch plate will not be imparted to the other.

The clutch plate 75 is provided with an annular flange 76 of substantially reduced thickness. Attached to the other face of the clutch plate 75 is a yoke 77 shown clearly in Figure 5. The attachment is effected by means of bolts 78. The upper end of the yoke 77 defines a pair of substantially parallel spaced apart arms 79. Journaled in the arms 79 is a shaft 80 upon which is pivotally received a rocker plate 81. A pin 82 threaded through one end of rocker plate 81 projects away from the face of rocker plate 81 remote from the clutch plate 75. Also, a pair of springs 83 are provided at the same end of rocker plate 81 and bias against the face of the rocker plate 81 nearest the clutch plate 75. The arrangement is such that the springs 83 normally bias the rocker plate 81 to assume the position illustrated by the dotted lines of Figure 6. However, the other end of the rocker plate 81 is beveled on its face nearest the clutch plate 75 and when the clutch plates 65 and 75 are engaged, the rocker plate 81 is rocked by a pin 84 in a direction opposite to the bias of the springs 83. The pin 84 extends through bores in the yoke 77 and clutch plate 75 and abuts against the clutch plate 65.

Also mounted on the shaft section 66b is a pulley wheel 90 by means of a ball-bearing assembly 91. Serving as a spacer for the ball-bearing assembly 76 and 91 there is provided a bearing collar 92. A nut 93 is screwed onto the threaded section 70 of the shaft section 66c and bears against the ball-bearing assembly 91 thereby securely locking the assemblies 76, 91 and collar 92 against a shoulder cut in clutch plate 75. As will be noted from Figure 6, the cable 36, which passes through the tube 33, passes around the pulley wheel 90 and thereafter is led to the winding drum 37. A lost motion connection is provided between pulley wheel 90 and clutch plate 75 such that the latter will be forced to rotate with the former, but only after pulley wheel 90 has rotated through a predetermined arc. The lost motion connection is comprised as follows. Attached to the clutch plate 75 by means of bolt 94 is a stub 95. Mounted to the face of the pulley wheel 90 adjacent to the yoke 77 in spaced relation are a pair of similar stubs 96, the mounting means for all three being the same. The stubs 95 and 96 are all mounted on the same arc in accordance with the showing of Figure 5.

According to the above description when the operating handle is in the upper or "in" position, the clutch plates 65 and 75 will be coupled or engaged and the pin 82 of the rocker plate 81 will be in its withdrawn position with respect to the pulley wheel 90 due to the influence of pin 84. Accordingly, rotation of the pulley wheel 90 by virtue of travel of cable 36 will result in rotational movement of the clutch plate 75 through the lost motion connection at such time when the stub 96 strikes against one of the stubs 95. Thereafter, the clutch plate 75 will closely follow the rotary movement of the pulley wheel 90, as long as the direction of rotation remains the same. Should the direction of rotation of pulley wheel 90 be reversed, the pulley wheel 90 will rotate relative to clutch plate 75 until the stub 96 strikes against the other stub 95 of clutch plate 75. Thus, any vibratory or oscillatory motions occurring in the pulley wheel 90 will be substantially dampened during transmission of rotary movement to the clutch plate 75 by virtue of the lost motion connection.

When, however, the operating handle 23 is in the lower or "out" position, the clutch plate 65 and 75 will be uncoupled and also the pin 84 will be in the dotted line position and to the left (Figure 6) no longer resisting the biasing effect of the springs 83. Accordingly the rocker plate 81 will be rocked by springs 83 into the position illustrated in dotted lines in Figure 6, in which position the pin 82 will be in firm contact and engagement with the face of the pulley wheel 90. In this condition, any and all movements of the pulley wheel 90 will be directly imparted to the clutch plate 75 through the medium of the yoke 77 and more specifically, through the pin 82. Thus, any vibratory or oscillatory movements of the pulley wheel 90 will not be dampened, but rather will be directly imparted to the clutch plate 75.

A shaft 100 is journaled into the rear frame plate 44 and projects through and is bearing-supported by the frame partition 51. Received on the shaft 100 is a rod 101 which is fixed to the shaft 100 by means of pin 102. At the lower end of the rod 101 is provided a turned-down section 101a provided with a radial bore. Fitted into the radial bore and projecting from either side of the section 101a is a pin 103. Mounted onto the reduced section 101a and resting on the pin 103 is a horse-shoe shaped permanent magnet 104 with the poles of the magnet resting against the flange 76 of the clutch plate 75. Thus, rotation of the clutch plate 75 in either direction will drag the permanent magnet 104 with it, thus pivoting the rod 101 about the axis of shaft 100. Since the rod 101 is fixed to the shaft 100, the latter will have imparted to it rotary motion in a direction depending upon the direction of rotation of the clutch plate 75. To limit the movement of the rod 101 symmetrically relative to clutch plate 75, there are provided a pair of stops 105 fixed to the frame partition 51 on either side of the rod 100, as will be evident from Figure 5.

Figure 5:
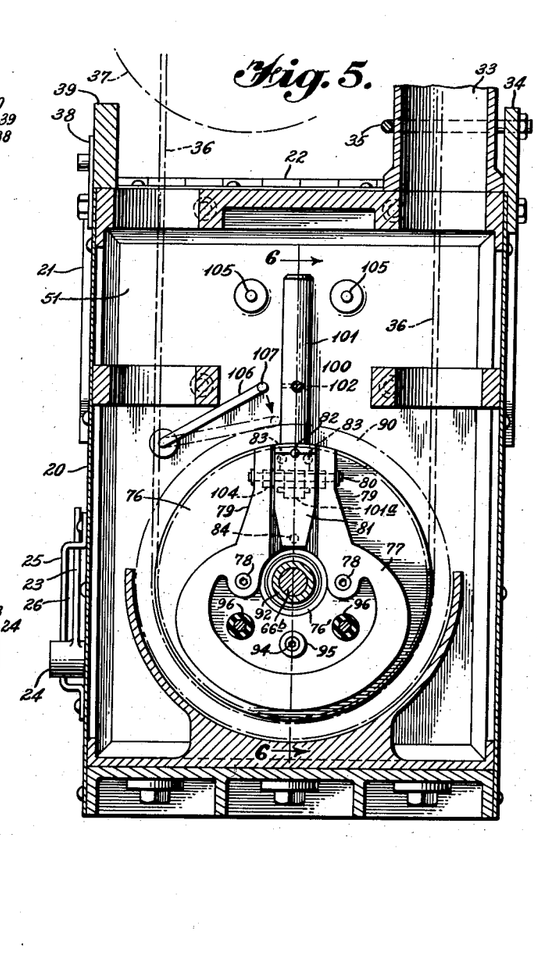
Figure 5 is a view in section of the apparatus illustrated in Figure 2 taken along line 5—5.

Connected to or integral with the stub shaft 56 on the opposite side of the frame partition from the arm 58 is an arm 106 provided with a right angle bend at its free end to define stop 107. When the operating handle 23 is located at the "in" position, the arm 106 and stop 107 will be in the position shown in solid lines in Figure 5 and will be removed from the rod 101 leaving same free to swing between the two stops 105. When, however, the operating handle 23 is depressed to the "out" position, the arm 106 and stop 107 are pivoted to the position shown in dotted lines in Figure 5 by virtue of the mechanical connection between the arm 107 and the shaft 50 in the form of radial finger 55, link 59, arm 58 and stub shaft 56. With the arm 106 and stop 107 in its new position, the rod 101 is restrained to swing only between the stop 105, as shown in Figure 5, to the left of rod 101 and the stop 107. In other words, it will be evident that the swing of the rod 101 is reduced to about one-half of its normal swing with the arm 106 and stop 107 in their elevated position.

Attached to the end of shaft 101, projecting from the frame partition 51 is an arm 110. Pivotally connected to the end of arm 110 is one end of link 111, the other end of which is pivotally connected to the free end of arm 112 (see Figure 4). The arm 112 is fixed onto a shaft 113 one end of which is bearing mounted in the frame partition 51 and the other end of which is bearing mounted in the front frame plate 45 (see Figure 3). Fixed onto the shaft 113 adjacent the forward end of the apparatus is an arm 114 the free end of which is pivotally connected with a link 115 (see Figure 8). The other end of the link 115 is pivotally connected with a pen support bracket 116 the lower end of which is pivotally mounted on a stub shaft 117 fixed into a front frame plate 45. The shaft section 66a extends toward the front of the apparatus and is journaled into a hub cast as a part of the front frame plate 45 by means of a ball bearing assembly 46 (see Figure 9). The main drive shaft projects through the front frame plate 45 and terminates in reduced shaft section 30 as previously described in conjunction with Figure 1. Since the shaft section 66a extends through the plane of the bracket 116, the bracket in the region of the shaft section 66a is provided with a portion that curves around the shaft section 66a. This aspect of the design of bracket 116 will be evident from an inspection of Figure 8. The upper part of the bracket 116 is provided with a projecting housing 118 that defines a bore therethrough. Received in this bore, is a leaf spring element 119 which is held in position by means of a set screw 120 (see Figure 2) which is arranged to control the biasing effect of the leaf spring element 119. Attached to the other end of the leaf spring element 119 is a pen holding bracket 121 which defines a bore in which is received the recording tip 122 of a recording pen 123. To maintain the positioning of the tip 122 and pen 123 the bracket 121 defines a threaded bore in which is received a set screw 124 that bears against the pen 123. The pen 123 is of the self-contained type and thus the marking medium is contained in the barrel of the pen 123. When the supply of marking medium is exhausted, it is only necessary to loosen set screw 124, remove the pen 123 and substitute a fresh one.

To the forward end of the shaft section 66a spaced from the front frame plate 45 is mounted a large collar 130 which defines a diametrically opposed pair of threaded holes 131. Likewise, the collar 130 defines a pair of rectangular recesses 132 each of which is axially aligned with one of the threaded holes 131. Received in each of the recesses 132 is an arm 133 rectangular in cross-section and cut with a beveled surface 134 at its outer projecting extremity. In addition, each arm 133 is cut with a slot opening in the direction of its respective threaded bore 131. A locking assembly for adjustably positioning the arms 133 in the slots 132 and for controlling the extent that the arms 133 project from the collar 130 is provided for each arm 133 and consists essentially of a flanged-headed set screw 136 being threaded into each threaded bore 131 with the flange 135 of the screw 136 being received in the slot of the respective arm 133. A cotter pin 137 passes through one of a series of peripherally spaced holes in the peripheral edge portion of each flange 135 to restrict threading action of the set screw 136 relative to the arm 133. Thus, the cotter pins 137 prevent the set screws 136 from being moved more than about three-quarters of a turn and thus effectively lock the arms 133 in their fixed positions. In the normal set up of the apparatus, it is preferred that one of the arms 133 project away from the collar 130 a slightly greater distance than does projection of the other of the arms 133. The reason for this will become more apparent from the description hereinafter.

Fixed to the forward face of collar 130 is a spur gear 137, the teeth of which are in meshing engagement with a smaller spur gear 138. This latter spur gear 138 is bearing mounted and cantilever supported on one end of a stub shaft 139 which is threaded at its other end into the front frame plate 45. Also bearing mounted on the stub shaft 139 is a bevel gear 140 which is keyed to rotate with the spur gear 138 by virtue of set screw 141. In meshing engagement with the bevel gear 140 is a second bevel gear 142 fixed to the end of a shaft 143 (see Figures 2 and 8). A housing 144 surrounds the shaft 143 and a pin 145 extending through both the housing 144 and shaft 143 keys these two elements for rotation in common. The shaft 143 is supported by a bracket portion 146 which is cast as a part of the front frame plate 45. Also, the lower end of the housing or sleeve 144 rides on the upper surface of the bracket part 146. Also received within the sleeve 144 at its upper end is a shaft 147 which projects upwardly through a second bracket part 148 preferably cast as part of the front frame plate 45 and has fixed thereon above the bracket part 148 a bevel gear 149. The shaft 147 projects above the bevel gear 149 and terminates in a rounded head 150. The sleeve 144 is provided with a slot 151 and a pin 152, sliding in the slot 151, is fixed to the shaft 147. Thus, the sleeve 144 and shaft 147 are likewise keyed for rotation in common. The upper end of the sleeve 144 rides against the undersurface of the bracket part 148. A spring 153 is housed in the sleeve 144 between the shaft 147 and the shaft 143 resiliently forming the lower support for shaft 147.

The bevel gear 149 is in meshing engagement with a bevel gear 154 fixed to the end of a register operating shaft, not shown, which directly drives register 155 conveniently mounted onto front frame plate 45. As will be evident, the force of spring 153 insures meshing of the bevel gears 149 and 154. Should it be desired to reset the rigister 155, the bevel gear 149 may be easily and readily disconnected from the bevel gear 154 simply by depressing the shaft 147 against the bias of spring 153 until the two bevel gears 149 and 154 are clear. This may readily be accomplished by exerting a manual force against the round head 150 of the shaft 147. With the bevel gears 149 and 154 clear, the register may be reset as desired.

In accordance with the above description, rotation of the shaft section 66a will drive the register through the gearing and shaft connections as set forth. Although it is possible to vary the ratio of the gears in many respects, it is preferable that each rotation of shaft section 66a represents two linear feet of cable travel. Thus, for each one-half turn of the shaft section 66a, the register 155 should advance one unit. In this regard, the circumference of the pulley wheel 90 must be preselected at 24 inches.

A bell crank 160 is pivotally mounted and cantilever supported on a stub shaft 161 having one end fixed to the front frame plate 45. The bell crank 160 is essentially comprised of a hub part 162 and integral ear 163 located on one side of the shaft 161 and a crank arm 164 located on the opposite side of the shaft 161. The ear 163 is connected by means of spring 165 to a bracket projection 166 preferably cast as part of the front frame plate 45. By virtue of spring 165, the bell crank is biased in a counter-clockwise direction as viewed in Figure 8. At the end of arm 164, there is mounted in identically the same fashion, as is mounted at the end of bracket 116, a leaf spring element 167. To the other end of leaf spring element 167 is attached a pen holding bracket 168 which defines a bore that receives the recording tip 169 of a recording pen 170. As before, a set screw 171 is provided to retain the tip 169 in the bore of bracket 168. In all respects, the mounting and the design of the pen 170 is similar to the pen 123.

The bell crank, as will be appreciated, is primarily fashioned from two parts, namely the crank arm 164 and the hub 162 and integral ear 163. The two components are connected together, as will be evident from Figures 8 and 9, by screw 172. Caught between the bottom surface of the crank arm 164 and the hub 162 and ear 163 is a leaf spring element 173 which projects slightly beyond the lower edge of the bell crank arm 164. The relationship between the leaf spring element 173 and the arms 133 mounted in the collar 130 is such that as shaft section 66a rotates in a counter-clockwise direction, the extreme tip of each arm 133 will contact the extreme end of the leaf spring element 173 and force the bell crank arm 164, the hub 162 and the ear 163 to rotate about the axis of shaft 161 in a clockwise direction against the pull of spring 165 until the extreme end of leaf spring element 173 has moved sufficiently to the right, as viewed in Figure 8, to permit the arm 133 to pass. This swinging movement of the bell crank arm 164 will cause the recording pen 170 to be moved to the right as viewed in Figure 8. Since, as previously explained, one of the arms 133 projects further from collar 130 than the other arm 133, the swinging movements imparted to the crank arm 164 will be of different amounts depending upon which of the arms 133 strikes the end of the leaf spring element 173. As will be also noted, the apparatus is preferably designed, as previously mentioned, so that each complete revolution of the shaft section 66a corresponds to two linear feet of cable travel. Because the arms 133 are located on a diameter of the collar 130, attached to the shaft section 66a, an arm 133 will strike against the free end of the leaf spring element 173 at a point in time corresponding to one linear foot of cable travel.

The purpose of the beveled surface 134 at the end of each arm 133 is to prevent actuation of the crank arm 164 whenever the shaft section 66a is being rotated in a clockwise direction. In these circumstances, the beveled surface of the arm 133 will strike against the upper surface of the free end of the leaf spring element 173 and will merely force its way past without actuating the crank arm 164. As will be evident, the extreme tip of each arm 133 does not project sufficiently to strike against the crank arm proper (see Figure 8).

Figure 9:
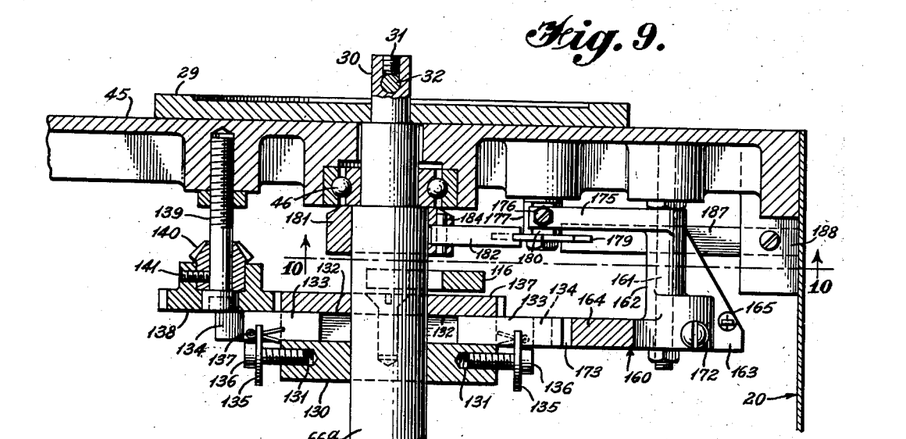
Figure 9 is a view in section of Figure 8 taken along line 9—9.

Also integral with the hub 162 is a second arm 175 (see Figure 9). The free end of arm 175 is provided with a set screw 176 which rides on the surface of a cam 177. This cam 177 is bearing mounted on a stub shaft 178 (see Figure 10) fixed into the front frame plate 45. Also mounted on shaft 178 and fixed to rotate with the cam 177 is a five-armed star wheel 179. The surface of cam 177 is cylindrical and defines at one area a flat plateau generally designated by the numeral 180. Fixed on the shaft section 66a is a collar 181 (see Figures 9 and 10). A pawl 182, having a beveled edge 183 at its free end, is pivotally mounted into one end of an arcuate slot in the collar 181 by means of pin 184. The free end of the pawl 182 is resiliently biased against the end of the slot by means of spring 185 extending from the free end of pawl 182 to a point on the collar 181 peripherally spaced from the pin 184 according to the illustration of Figure 10. The pawl 182 as mounted can pivot in a counter-clockwise direction against the bias of spring 185 but is restrained against movement in a clockwise direction since it bears against the end of the slot in collar 181. The extreme end of pawl 182 is cut at an incline and the tip thus defined cooperates with the star wheel 179. For each full rotation of the shaft section 66a, the pawl 182 will engage the star wheel 179 and move same one-fifth of a turn. A star wheel follower is provided in the form of leaf spring element 187 which is mounted at one end to a bracket 188 attached to or cast as a part of side frame plate 47 and its free end engages with the star wheel 179.

Figure 10:
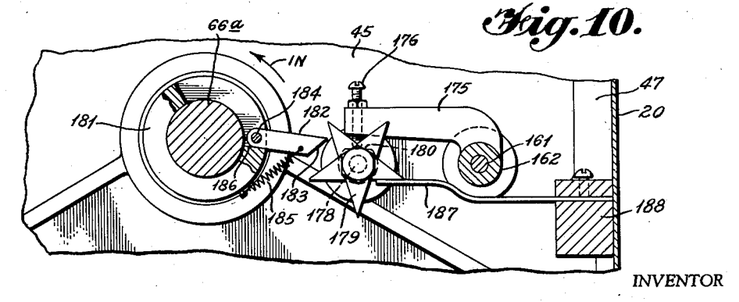
Figure 10 is a view in section of Figure 9 taken along line 10—10.

Whenever the star wheel has rotated so that the set screw 176 comes to rest on the plateau 180, the arm 175 will necessarily pivot slightly in a counter-clockwise direction, as viewed in Figure 10, during the movement of the set screw 170 from the cylindrical surface of cam 177 to the plateau 180. This slight counter-clockwise movement of the arm 175, as viewed in Figure 10, will be reflected by hub 162, ear 163 and crank arm 164 which will also move slightly in a counter-clockwise direction. The force for this movement is supplied, as will be appreciated, by the action of spring 165. When this condition occurs, the pen 170 which is attached to the crank arm 164 will move slightly to the left, as viewed in Figure 8. Since each revolution of shaft section 66a represents two linear feet of cable travel, the pen 170 will be moved slightly to the left after ten linear feet of cable travel and will remain in this position for two linear feet of cable travel.

Figure 2:
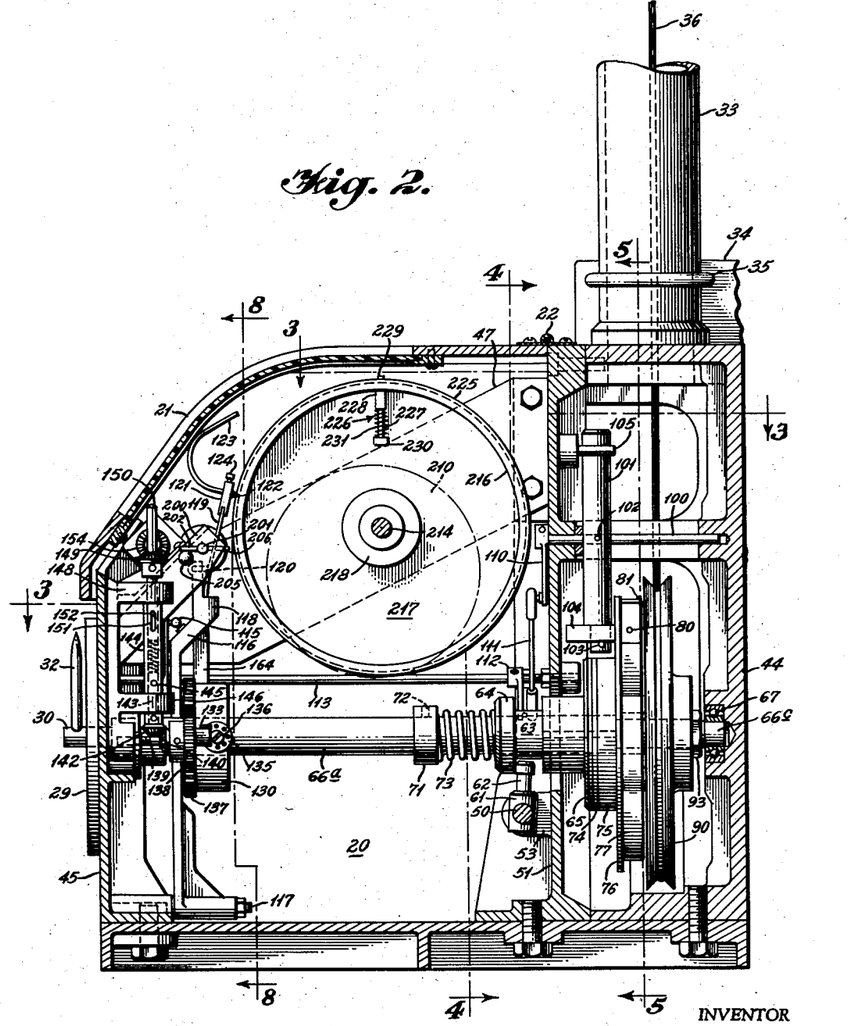
Figure 2 is a view in section of the apparatus illustrated in Figure 1 with the right side removed.
Figure 3:
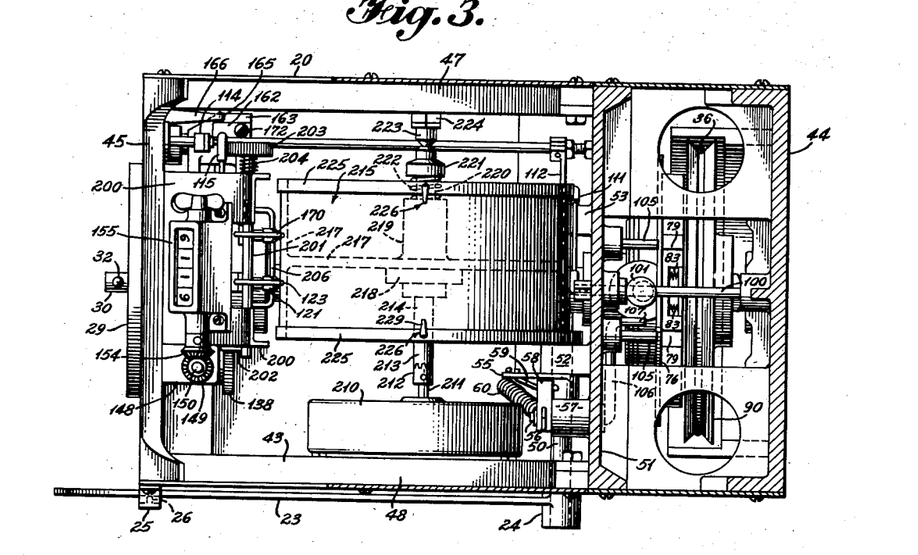
Figure 3 is a view in section of the apparatus illustrated in Figure 2 taken along line 3—3.
Figure 8:
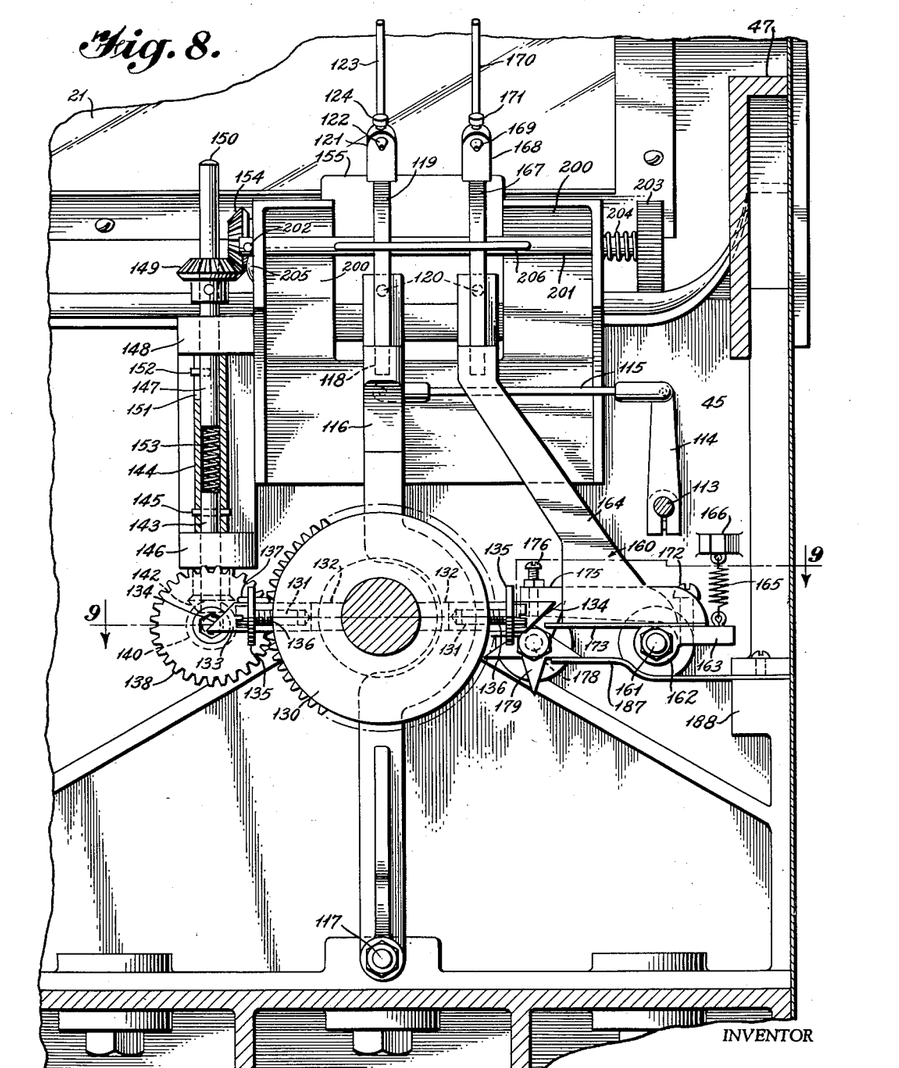
Figure 8 is a view in section of Figure 2 taken along line 8—8.

Cast as a part of the front frame plate 45 is a yoke consisting of two projecting legs 200. Journaled into and bearing supported by the legs 200 is a rod 201 which extends behind the leaf spring elements 119 and 167 as seen in Figure 8. A pin 202 is fixed into one end of the rod 201 on the outside face of one of the legs 200 and a knob 203 is fixed to the other end of the rod 201 outside of the other leg 200. Between the knob 203 and the leg 200 a spring 204 is mounted on the rod 201 bearing against the knob 203, biasing the knob 203 and rod 201 to the right as viewed in Figure 8, and as a result of this action holding the pin 202 against the outside surface of its respective leg 200. A raised projection 205 is fixed to the outside surface of the leg 200 in a cooperative relationship with pin 202. A U-shaped bar 206 is connected to the rod 200 and extends in front of the leaf spring elements 119 and 167. With the apparatus as shown in Figures 2 and 8, the pens 123 and 170 are free of the U-shaped bar 206 and consequently can function during a recording operation. When, however, it is desired to lift the pens to a nonrecording position, it is merely necessary to rotate the rod 201 by manipulating the knob 203 in a counter-clockwise direction as viewed in Figure 2, thereby swinging the U-shaped bar 206 upwardly to bear against the leaf spring elements 119 and 167 and move them to the left out of recording position. During this counter-clockwise rotation of the rod 201, the pin 202 will pass over the projection 205 to its other side. Due to the cooperation between the spring 204 and the rod 201, the lifting assembly will be maintained in its new position until it is manually returned to its original position by suitably manipulating the knob 203 in a clockwise direction.

A spring timing motor 210 is mounted to the side frame plate 43. Timing motor 210 may be of any type although it is preferred that the motor be of the spring operated type. In order to afford access to the motor 210 to periodically wind it, a hole 311 is defined in the casing 20 and side frame plate 43 to permit insertion of a key. Projecting from the timing motor 210 is the timing motor shaft 211 (see Figure 3). Fixed to the end of shaft 211 is a toothed clutch element 212. In meshing engagement with this clutch element 212 is a complementary toothed clutch element 213 either designed as a part of or attached to shaft 214.

A recording drum 215 is mounted onto the shaft 214 and fixed thereto for rotation in common. The recording drum 215 is made as a ring-like member 216 provided with a centrally located supporting partition 217. Integrally attached with this partition 217 is hub structure 218 into which is fixed shaft 214. Also integrally fashioned with the partition 217 is hub 219. It is preferred that the ring 216, the partition 217 and the hub 219 all be cast as a single element. Received within the hub 219 in sliding engagement therewith is a shaft 220. Fixed to the end of shaft 220 spaced from the end of hub 219 is a collar 221 and mounted on the shaft 220 between the collar 221 and the end of hub 219 is a spring 222. The purpose of this arrangement is to normally bias the shaft 220 to extend out of the hub 219, but at the same time resiliently permit the shaft 220 to be retracted within the hub 219 thereby shortening the overall distance from the clutch element 213 to the end of shaft 220. The extreme end of the shaft 220 is provided with a recess in which is received a plug 223 fixed to the other side frame plate 47 by means of bracket 224. As thus will be evident, the drum 215 is mounted within the apparatus for rotation by the timing motor 210. The surface of the ring 216 functions as the recording surface and the relationship between the drum and the recording pens is such that the leaf spring elements 167 and 119 will normally cause the pens to bear against the surface of the ring 216.

The drum is further characterized by a pair of marginal flanges 225 slightly raised from the surface of the ring 216. A recording chart in the form of a strip of paper is wrapped around the surface of ring 216 between the flanges 225 and is held in position by clips 226. Each clip 226 is composed of a rod 227 which fits through a sleeve 228 attached to the undersurface of the flange 225 and projects through the flange 225. A finger element 229 terminating in a point is connected to the end of the rod 227 and extends over the surface of ring 216. The other end of the rod 227 is provided with an enlarged head 230 and a spring 231 is received on the rod 227 bearing against the head 230 and the lower end of the sleeve 228 biasing the rod 227 downwardly and thus in effect biasing the finger element 229 into contact with the surface of ring 216.

Figure 11:
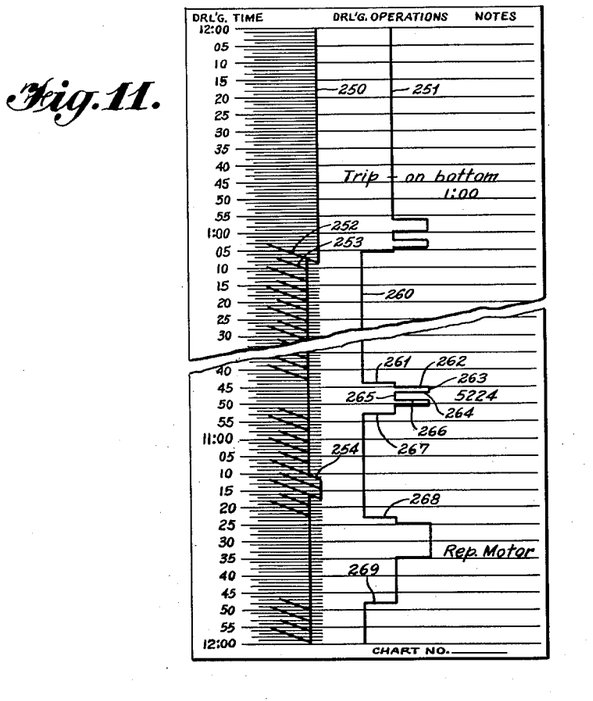
Figure 11 is a schematic illustration of the type of chart which is produced by the recording apparatus of the present invention.

The type of recording chart employed in connection with the apparatus of the present invention is illustrated in Figure 11. As will be noted, the chart is printed with indicia indicating drilling time in a column at its left edge and drilling operations and notes are headings provided for the right side of the chart. The recording pen 170 will in the operation of the apparatus, mark the chart with the line 250. The recording pen 123 in the operation of the apparatus will mark the chart with a second line 251. The speed and depth of a drilling phase will be recorded by the apparatus when the operating handle 23 is located at the "in" position. With the apparatus in this condition, recording will commence when the drill bit has been brought to the bottom of the hole. As drilling commences, the pen 170 will mark line 250 on the recording chart. As will be evident, this record is characterized by a substantially vertical line with frequent short inclined lines extending to the left therefrom. These inclined lines are of two different lengths and are identified by the numerals 252 and 253. The recording pen 170 is caused to make these side swings due to the action of the arms 133 on the bell crank arm 164. Inasmuch as one of the arms 133 projects out further than the other, every other side swing of the recording pen 170 will be of slightly greater length. Each side swing of the recording pen 170 represents an advance of the drill bit into the earth a distance of one foot in accordance with the calibration of the apparatus as previously explained and each long side swing 252 will be indicative of an advance of two feet. For every five rotations of the shaft section 66a, the cam 177 will present its plateau 180 to the set screw 176. When this occurs, the recording pen 170 will shift slightly to the right as indicated by the breaks 254 to the right. These breaks, due to the calibration of the apparatus, will be indicative of an advance of ten feet into the hole by the drill bit.

During a drilling operation, the recording pen 123 will trace the portion of line 251 indicated by the numeral 260. When, however, a drilling operation ceases and it becomes necessary to make repairs, pull drill pipe etc., the operating handle 223 is moved to the "out" position and since this results in rod 106 and stop 107 being swung to their position shown in dotted lines in Figure 5, the pen 123, through its linkage connecting it with the rod 101, will make the line break 261 by shifting to the right. Thereafter, as the operations in connection with the wheel are in general first pulling something from the well, the traveling block will be moving upwardly with respect to the derrick and the direction of travel of cable 36 will be reversed to what it was during a drilling phase and thus the direction of rotation of the pulley wheel 90 will be reversed causing the pen 123 to shift to the right and make the line indicated by the numeral 262. The line 263 indicates the elapsed time (disconnecting the kelly) after the travelling block reaches its upper position and before it commences its downward movement. The line 264 indicates that the direction of the travelling block has been reversed and it is again moving downwardly with respect to the derrick. The line 265 is indicative of the length of downward movement of the travelling block. The line 266 is indicative of the travelling block reversing direction and again moving upwardly with respect to the derrick, etc. When the drilling operation is to be commenced anew, the operating handle 23 is again moved to the "in" position and as soon as the travelling block moves downwardly with respect to the derrick, the rod 101 is no longer restrained by the stop 107 and hence the recording pen 123 will shift to the left making the segment 267. At the lower part of the chart appears the legend "REP MOTOR." This effectively demonstrates the manner in which the chart may record information other than simply drilling or pulling drill pipe. During the recording of this portion of the chart, a motor was under repair for a period of time as indicated by the spacing of line segments 268 and 269. The legend "5224" appearing on the chart indicates the depth at that point in the recording to which the well has been drilled.

In the normal operation of the apparatus with the operating handle 23 located at the "in" position, the rocker plate 81 and pin 82 will be spaced from the pulley wheel 90 under the action of the pin 84. Thus, as previously described, movement of the pulley wheel 90 will be imparted to the clutch plate 75 through the lost motion arrangement constituted by the studs 95 and 96. Consequently, short arcuate movements of the pulley wheel 90 will not be passed onto the clutch plate 75 but will be dampened. When, however, it is desired to obtain an indication of the strain placed on the derrick, the following procedure can be adopted. The cable 36 is attached to the well derrick at some convenient point, say the top or a leg, and the operating handle 23 is depressed to its "out" position. This results in the rocker plate 81 and pin 82 being rocked against the pulley wheel 90 under the influence of springs 83 since pin 84, in these circumstances, is in its retracted position no longer influencing the rocker arm 81. Consequently, all motions of the pulley wheel 90 are imparted to the clutch plate 75 regardless of their magnitude. With the apparatus in this condition and hooked up to the derrick, as above described, the strain on the derrick can be recorded in conjunction with, for example, pulling of pipe from the well. During the pipe pulling operation, the strain placed on the derrick will cause it to make small movements in a substantially vertical plane and these movements will result in the cable 36 being alternately taken up and paid out from the winding drum 37. The movement of cable 36 in each direction will ordinarily be small and only produce a small arcuate motion of the pulley wheel 90. Since, however, the clutch plate 75 is now directly connected with the pulley wheel 90 through the medium of the rocker plate 81 and pin 82, these small movements of the pulley wheel 90 will be imparted to the clutch plate 75. Likewise, the magnet 104 riding against the flange 76 of the clutch plate 75 will be alternately swung in short arcs in both directions depending, of course, upon the direction of cable travel. This movement of the magnet will be transmitted through the rod 101 and the remaining linkage that connects rod 101 to the pen 123 which in turn will cause to be marked onto the recording chart short line segments indicative of the amount of strain impressed upon the derrick during the pipe pulling operation. The same procedure may likewise be followed in conjunction with running pipe down into a well in order to ascertain the strain placed on the derrick. In addition, other uses of the apparatus for strain indications can be made and the strain placed on any portion of the well drilling rig can be recorded, as will be evident.

Figure 12:
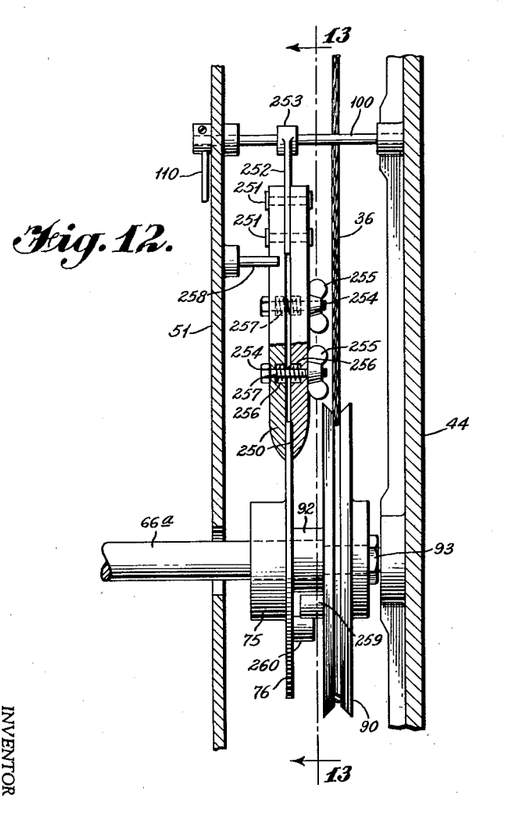
Figure 12 is a view similar to Figure 6 showing an alternative arrangement for actuating the recording pens.
Figure 13:
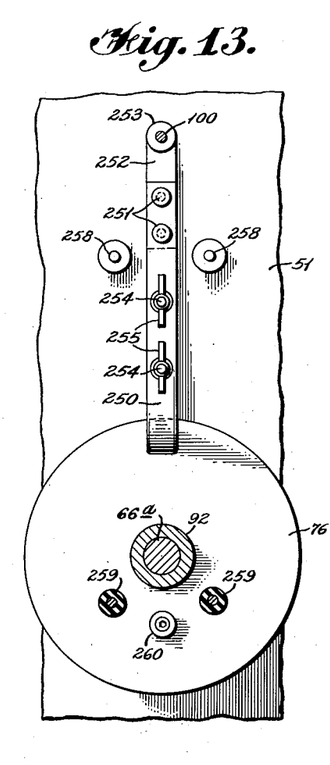
Figure 13 is a view in section of Figure 12 taken along line 13—13.

In Figures 12 and 13, there is disclosed a modification of the pick-up apparatus which cooperates with the flange 76 of the clutch plate 75 for transmitting motions of the clutch plate 75 to the pen 123. For purposes of clarification, only those parts of the apparatus necessary for an understanding of the modification disclosed in Figures 12 and 13 have been shown, and parts corresponding with parts appearing in the other figures of the drawings have been identified by the same numerals. As shown in Figures 12 and 13, the modified pick-up is comprised essentially of a pair of clamp plates 250 which engage at one end on opposite faces of the flange 76 and which are connected together at their other end by means of pins 251. Received on the pins 251 in a position between the two clamp plates 250 is a plate 252 which terminates in a hub section 253 fixed onto the shaft 100. The two clamp plates 250 are resiliently held together at their lower ends in order to engage frictionally the flange 76. This is accomplished by means of spring loaded clamps consisting of bolts 254 which pass through the clamping plates 250 and which have received on their threaded ends wing nuts 255. The adjacent surfaces of the clamping plates 250 are recessed as indicated at 256 in the region of the bolts 254 and received in these recesses 256 and mounted around the bolt 254 are springs 257. The arrangement is such that the clamping plates 250 are urged apart under controlled tension while at the same time being fixed by the bolts 254 and wing nuts 255. This permits the desired frictional engagement with the flange 76 of the clutch plate 75 such that the pick-up assembly will be dragged in either direction under the influence of the clutch plate 75 and flange 76.

In order to limit the pivotal movement of the pick-up assembly, stops 258 are provided fixed to the frame partition 51. As before, a lost motion connection is provided between the pulley wheel 90 and the clutch plate 75 and comprises, in the present instance, a pair of studs 259 fixed to the pulley wheel 90 and a stud 260 fixed to the flange 76. All three studs are located spaced on an arc whereby rotation of the pulley wheel 90 in one direction will cause one of the studs 259 to strike against the stud 260 to cause the clutch plate 75 to follow the movement of the pulley wheel 90 and rotation in the opposite direction will result in the other stud 259 striking against the stud 260.

Although the present invention has been described with reference to particular parameters, gear ratios, and dimensions, it is to be fully understood that such statements made hereinbefore are merely illustrative of the present invention and in no way restrict the scope or use of the apparatus as other parameters, gear ratios and dimensions may be employed. Accordingly, although the invention has been described with reference to specific embodiments, various modifications and changes obvious to one skilled in the art from the knowledge of the present disclosure are deemed to be within the spirit, scope and contemplation of the present invention.

What is claimed is:

1. A recorder including a chart, means movably supporting said chart, means for advancing said chart, a recording element, means pivotally supporting said recording element for contact with said chart, a shaft, a first clutch plate mounted on said shaft freely rotatable relative thereto, a freely movable pick-up means connected to said recording element and actuated responsive to rotation of said first clutch plate, an operating mechanism having irregular movements in opposite directions, a lost motion connection between said first clutch plate and said operating mechanism, a second clutch plate keyed to said shaft, means for coupling and uncoupling said clutch plates, and means responsive to the actuation of said last mentioned means to uncouple said clutch plates for providing an additional and direct connection between said first clutch plate and said operating mechanism.

2. A recorder including a chart, means movably supporting said chart, means for advancing said chart, a recording element, means pivotally supporting said recording element for contact with said chart, a shaft, a first clutch plate mounted on said shaft, freely rotatable relative thereto, a freely movable magnet connected to said recording element, said first clutch plate being formed of a magnetizable metal and being supported on said shaft in the field of said magnet, an operating mechanism having irregular movements in opposite directions, a lost motion connection between said first clutch plate and said operating mechanism, a second clutch plate keyed to said shaft, means for coupling and uncoupling said clutch plates, and means responsive to the actuation of said last mentioned means to uncouple said clutch plates for providing an additional and direct connection between said first clutch plate and said operating mechanism.

3. A recorder including a chart, means movably supporting said chart, means for advancing said chart, a recording element, means pivotally supporting said recording element for contact with said chart, a shaft, a first clutch plate mounted on said shaft freely rotatable relative thereto, a freely movable pick-up means connected to said recording element and actuated responsive to rotation of said first clutch plate, a pulley wheel mounted on said shaft adjacent said first clutch plate for rotation relative to said shaft, means for imparting to said pulley wheel irregular movements in opposite directions, a lost motion connection between said pulley wheel and said first clutch plate, a second clutch plate keyed onto said shaft, means for coupling and uncoupling said clutch plates, and means responsive to the actuation of said last mentioned means to that condition where said clutch plates are uncoupled for providing and additional and direct connection between said first clutch plate and said pulley wheel.

4. A recorder including a chart, means movably supporting said chart, means for advancing said chart, a recording element, means pivotally supporting said recording element for contact with said chart, a rotor, a freely movable pick-up means connected to said recording element and actuated responsive to rotation of said rotor, an operating mechanism having irregular movements in opposite directions, a lost motion connection between said rotor and said operating mechanism, and means mounted on said motor selectively operative for by-passing said lost motion connection and for directly engaging said operating mechanism whereby all movements of said operating mechanism will be transmitted to said rotor.

5. A recorder including a chart, means movably supporting said chart, means for advancing said chart, a recording element, means pivotally supporting said recording element for contact with said chart, a rotor, a freely movable pick-up means connected to said recording element and actuated responsive to rotation of said rotor, an operating mechanism having irregular movements in opposite directions, a lost motion connection between said rotor and said operating mechanism, and means mounted on one of said rotor and said operating mechanism selectively operative for by-passing said lost motion connection and for directly engaging the other of said rotor and said operating mechanism whereby all movements of said operating mechanism will be imparted to said rotor.

6. A recorder including a chart, means movably supporting said chart, means for advancing said chart, a recording element, means pivotally supporting said recording element for contact with said chart, a freely movable magnet connected to said recording element, a rotor formed of a magnetizable metal, means supporting said rotor in the field of said magnet, an operating mechanism having irregular movements in opposite directions, and a lost motion connection between said rotor and said operating mechanism, and means mounted on said rotor selectively operative for by-passing said lost motion connection and for directly engaging said operating mechanism whereby all movements of said operating mechanism will be imparted to said rotor.

7. A recorder including a chart, means movably supporting said chart, means for advancing said chart, a recording element, means pivotally supporting said recording element for contact with said chart, a rotor, a freely movable pick-up means connected to said recording element and actuated responsive to rotation of said rotor, a pulley wheel, means for imparting to said pulley wheel irregular movements in opposite directions, and a lost motion connection between said pulley wheel and said rotor, and means mounted on said rotor selectively operative for by-passing said lost motion connection and for directly engaging said pulley wheel whereby all movements of said pulley wheel will be imparted to said rotor.

8. A recorder incuding a chart, means movably supporting said chart, means for advancing said chart, a recording element, means pivotally supporting said recording element for contact with said chart, a freely movable magnet connected to said recording element, a rotor formed of a magnetizable metal, means supporting said rotor in the field of said magnet, a pulley wheel, means for imparting to said pulley wheel irregular movements in opposite directions, and a lost motion connection between said pulley wheel and said rotor, and means mounted on said rotor selectively operative for by-passing said lost motion connection and for directly engaging said pulley wheel whereby all movements of said pulley wheel will be imparted to said rotor.

9. A recorder incuding a chart, means movably supporting said chart, means for advancing said chart, a recording element, means pivotally supporting said recording element for contact with said chart, a rotor mounted on a shaft and selectively engageable with a means for rotating said shaft, a freely movable pick-up means connected to said recording element and actuated responsive to rotation of said rotor, an operating mechanism having irregular movements in opposite directions, a lost motion connection between said rotor and said operating mechanism, means mounted on one of said rotor and said operating mechanism selectively operative for by-passing said lost motion connection and for directly engaging the other of said rotor and said operating mechanism whereby all movements of said operating mechanism will be imparted to said rotor, a second recording element in contact with said chart, and means actuated responsive to rotation of said shaft for effecting a recording by said second recording element of definite predetermined advance by said shaft in one direction.

10. A recorder including a chart, means movably supporting said chart, means for advancing said chart, a recording element, means pivotally supporting said recording element for contact with said chart, a shaft, a first clutch plate mounted on said shaft freely rotatable relative thereto, a freely movable pick-up means connected to said recording element and actuated responsive to rotation of said first clutch plate, an operating mechanism having irregular movements in opposite directions, a lost motion connection between said first cluch plate and said operating mechanism, a second clutch plate keyed to said shaft, means for coupling and uncoupling said clutch plates, and means mounted on said first clutch plate operative for engaging said operating mechanism responsive to uncoupling said clutch plates whereby all movements of said operating mechanism will be imparted to said rotor when said clutch plates are uncoupled.

11. A recorder including a chart, means movably supporting said chart, means for advancing said chart, a recording element, means pivotally supporting said recording element for contact with said chart, a freely movable magnet connected to said recording element, a shaft, a first clutch plate formed of a magnetizable metal, means supporting said first clutch plate on said shaft to be freely rotatable relative thereto and in the field of said magnet, a pulley wheel, means mounting said pulley wheel on said shaft to be freely rotatable relative thereto, means for imparting to said pulley wheel irregular movements in opposite directions, a lost motion connection between said pulley wheel and said first clutch plate, a second clutch plate, means keying said second clutch plate to said shaft, means for coupling and uncoupling said clutch plates, and means mounted on said first clutch plate operative for engaging said pulley wheel responsive to uncoupling of said clutch plates whereby all movements of said pulley wheel will be imparted to said rotor when said clutch plates are uncoupled.

12. A recorder including a chart, means movably supporting said chart, means for advancing said chart, a recording element, means pivotally supporting said recording element for contact with said chart, a rotor, a freely movable pick-up means connected to said recording element and actuated responsive to rotation of said rotor, an operating mechanism having irregular movements in opposite directions, and a lost motion connection between said rotor and said operating mechanism, a second recording element in contact with said chart, and means actuated responsive to rotation of said rotor for effecting a recording by said second recording element of definite predetermined advance of said rotor in one direction, and means mounted on said rotor selectively operative for by-passing said lost motion connection and for directly engaging said operating mechanism whereby all movements of said operating mechanism will be imparted to said rotor.

13. A recorder including a chart, means movably supporting said chart, means for advancing said chart, a recording element, means pivotally supporting said recording element for contact with said chart, a rotor, a freely movable pick-up means connected to said recording element and actuated responsive to rotation of said rotor, a pulley wheel, means for imparting to said pulley wheel irregular movements in opposite directions, and a lost motion connection between said pulley wheel and said rotor, a second recording element in contact with said chart, and means actuated responsive to rotation of said rotor for effecting a recording by said second recording element of definite predetermined advance of said rotor in one direction, and means mounted on said rotor selectively operative for by-passing said lost motion connection and for directly engaging said pulley wheel whereby all movements of said pulley wheel will be imparted to said rotor.

14. A recorder including a chart, means movably supporting said chart, means for advancing said chart, a recording element, means pivotally supporting said recording element for contact with said chart, a shaft, a first clutch plate mounted on said shaft freely rotatable relative thereto, a freely movable pick-up means connected to said recording element and actuated responsive to rotation of said first clutch plate, an operating mechanism having irregular movements in opposite directions, a lost motion connection between said first clutch plate and said operating mechanism, a second clutch plate keyed to said shaft, means for coupling and uncoupling said clutch plates, and means mounted on said first clutch plate operative for engaging said operating mechanism responsive to uncoupling said clutch plates whereby all movements of said operating mechanism will be imparted to said rotor when said clutch plates are uncoupled, a second recording element in contact with said chart, and means actuated responsive to rotation of said shaft for effecting a recording by said second recording element of definite predetermined advance by said shaft in one direction.

15. A recorder including a chart, means movably supporting said chart, means for advancing said chart, a recording element, means pivotally supporting said recording element for contact with said chart, a shaft, a first clutch plate mounted on said shaft for rotation relative thereto, a freely movable magnet connected to said recording element, said first clutch plate being formed of a magnetizable metal and being supported on said shaft in the field of said magnet, an operating mechanism having irregular movements in opposite directions, a lost motion connection between said first clutch plate and said operating mechanism, a second clutch plate keyed to said shaft, means for coupling and uncoupling said clutch plates, and means mounted on said first clutch plate operative for engaging said operating mechanism responsive to uncoupling said clutch plates whereby all movements of said operating mechanism will be imparted to said rotor when said clutch plates are uncoupled, a second recording element in contact with said chart, and means actuated responsive to rotation of said shaft for effecting a recording by said second recording element of definite predetermined advance by said shaft in one direction.

16. A recorder including a chart, means movably supporting said chart, means for advancing said chart, a recording element, means pivotally supporting said recording element for contact with said chart, a shaft, a first clutch plate mounted on said shaft for rotation relative thereto, a freely movable pick-up means connected to said recording element and actuated responsive to rotation of said first clutch plate, a pulley wheel mounted on said shaft adjacent said first clutch plate for rotation relative to said shaft, means for imparting to said pulley wheel irregular movements in opposite directions, a lost motion connection between said pulley wheel and said first clutch plate, a second clutch plate keyed onto said shaft, means for coupling and uncoupling said clutch plates, and means mounted on said first clutch plate operative for engaging said pulley wheel responsive to uncoupling of said clutch plate whereby all movements of said pulley wheel will be imparted to said rotor when said clutch plates are uncoupled, a second recording element in contact with said chart, and means actuated responsive to rotation of said shaft for effecting a recording by said second recording element of definite predetermined advance by said shaft in one direction.

17. A recorder including a chart, means movably supporting said chart, means for advancing said chart, a recording element, means pivotally supporting said recording element for contact with said chart, a freely movable magnet connected to said recording element, a shaft, a first clutch plate formed of a magnetizable metal, means supporting said first clutch plate on said shaft to be freely rotatable relative thereto and in the field of said magnet, a pulley wheel, means mounting said pulley wheel on said shaft to be freely rotatable relative thereto, means for imparting to said pulley wheel irregular movements in opposite directions, a lost motion connection between said pulley wheel and said first clutch plate, a second clutch plate, means keying said second clutch plate to said shaft, means for coupling and uncoupling said clutch plates, and means mounted on said first clutch plate operative for engaging said pulley wheel responsive to uncoupling of said clutch plates whereby all movements of said pulley wheel will be imparted to said rotor when said clutch plates are uncoupled, a second recording element in contact with said chart, and means actuated responsive to rotation of said shaft for effecting a recording by said second recording element of definite predetermined advance by said shaft in one direction.

References Cited in the file of this patent

UNITED STATES PATENTS

| | | |
|---|---|---|
| 1,467,681 | Peters | Sept. 11, 1923 |
| 1,960,547 | Paulson | May 29, 1934 |
| 2,238,574 | Thomas et al. | Apr. 15, 1941 |
| 2,287,819 | Nichols | June 30, 1942 |
| 2,421,438 | Shonnard | June 3, 1947 |
| 2,679,161 | Yancey | May 25, 1954 |
| 2,860,509 | Phil | Nov. 18, 1958 |

UNITED STATES PATENT OFFICE

CERTIFICATE OF CORRECTION

Patent No. 2,883,256                                              April 21, 1959

Paul B. Nichols

It is hereby certified that error appears in the printed specification of the above numbered patent requiring correction and that the said Letters Patent should read as corrected below.

Column 3, line 62, after "medium of" insert -- a --; column 13, line 18, for "motor" read -- rotor --; line 66, and column 14, line 6, for "incuding", each occurrence, read -- including --.

Signed and sealed this 22nd day of September 1959.

(SEAL)
Attest:

KARL H. AXLINE
Attesting Officer

ROBERT C. WATSON
Commissioner of Patents